(12) United States Patent
Ratakonda et al.

(10) Patent No.: US 7,359,565 B2
(45) Date of Patent: Apr. 15, 2008

(54) METHOD OF FILTERING PIXELS IN A VIDEO ENCODING PROCESS

(75) Inventors: Krishna C. Ratakonda, Yorktown Heights, NY (US); Cesar A. Gonzales, Katonah, NY (US); Thomas A. Horvath, Stormville, NY (US); Thomas McCarthy, Cortlandt Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 699 days.

(21) Appl. No.: 10/836,255

(22) Filed: May 3, 2004

(65) Prior Publication Data

US 2005/0244076 A1 Nov. 3, 2005

(51) Int. Cl.
*G06K 9/40* (2006.01)
*G06K 9/46* (2006.01)

(52) U.S. Cl. .............. 382/260; 382/232; 382/254; 382/275

(58) Field of Classification Search ........ 382/232, 382/236, 260
See application file for complete search history.

(56) References Cited

U.S. PATENT DOCUMENTS

| | | | |
|---|---|---|---|
| 5,020,113 A | 5/1991 | Lo et al. | |
| 5,539,663 A | 7/1996 | Agarwal | |
| 6,037,986 A * | 3/2000 | Zhang et al. | 375/240.12 |
| 6,518,974 B2 | 2/2003 | Taylor et al. | |
| 6,930,676 B2 * | 8/2005 | De Haan et al. | 345/204 |
| 6,993,191 B2 * | 1/2006 | Petrescu | 382/205 |
| 7,145,607 B1 * | 12/2006 | Hui | 348/607 |
| 2003/0039310 A1 * | 2/2003 | Wu et al. | 375/240.16 |
| 2004/0267856 A1 * | 12/2004 | Macy, Jr. | 708/524 |

* cited by examiner

*Primary Examiner*—Jingge Wu
*Assistant Examiner*—José M Torres
(74) *Attorney, Agent, or Firm*—Lawrence Harbin; Derek S. Jennings

(57) ABSTRACT

A method and apparatus, particularly suited to SIMD instruction sets, to filter streaming video information encoded under a predictive encoding algorithm specified under video encoding standards, such as MPEG 4 or H.264/AVC. The filtering operation de-blocks or removes unwanted borders in the perceived video. During the filtering process, a series of filtering mask is generated based on temporal and spatial statistics of predictive encoded video information, which is then recursively applied to the video in order to gate filtered or unfiltered video to an output channel according to coefficients of the masks. The filtering mask effectively yields a decision or rule-based map that transforms the video on a pixel-by-pixel basis thereby avoiding complex and processor-intensive decision tree logic customarily required to process individual pixels of successive macroblocks that may have different filtering requirements.

3 Claims, 2 Drawing Sheets

METHOD OF FILTERING PIXELS IN A VIDEO ENCODING PROCESS

FIELD OF THE INVENTION

The present invention relates to real-time video processing, but more specifically, to a method and system to filter digital video information during compression or decoding.

BACKGROUND OF THE INVENTION

Video compression is useful for reducing the bandwidth required to transmit video or to minimize storage requirements of video data in a recording medium. Some applications include motion picture transmission and playback, video storage, videoconferencing, television broadcasting, video streaming over the Internet, and video communications generally. Lossless compression, although providing superior reproduction quality, has not proved to be viable in these applications. Lossy compression algorithms, on the other hand, which are specified by most video compression standards produce objectionable visual artifacts, such as "blocking" or checker board image in the perceived video. This phenomenon is more pronounced at low bandwidths or during low bit-rate transmission. In the context of predictive video coding specified under MPEG-1/2/4 and H.263/+/4 compression standards, for example, prediction chains typically span a large number of video frames. Since these standards employ macroblock processing of video information in 16×16 pixel arrays, progressive degradation of video quality ensues as cumulative error introduced by artifacts increases with the length of the prediction chain.

To reduce unwanted visual artifacts, filtering or de-blocking routines may be applied at any stage during compression or decompression (e.g., encoding or decoding). Pre-filtering occurs before compressing the video information. Dynamic pre-filters may be used in coordination with video encoding by modulating the degree of filtering in response to one or more control signals or certain statistical characteristics of the video information generated during the encoding stage. Post-filtering, on the other hand, occurs after decompressing (or decoding) the video information but before storing, transmitting, or displaying the information on a monitor. In addition, the degree of post-filtering may be modulated by one or more control signals responsive to the degree of perceived artifacts in the decompressed video information. It is known in the art, however, that pre-filtering rather than post-filtering more satisfactorily reduces unwanted visual artifacts. Routines that filter blocked-processed video information in a prediction chain require intense, high-speed processing since handling or transformation of the individual pixel elements within a macroblock may widely differ. The problem is exacerbated in SIMD (single instruction multiple data) architectures where multiple pixel elements are processed in a single instruction.

Loop filtering, which is defined under the H.263+ standard and also adopted in the recently ratified JVT-AVC H.264 standard, provides another filtering technique. These standards specify filtering video information within a prediction loop, and differ from pre-filtering in that video information is compressed before being filtered. During loop filtering, however, any prediction derived from previously compressed video information and used in subsequent compression steps is also filtered. Loop filtering implemented at the decoder is believed to produce the best reduction in compression artifacts. However, a standard that specifies loop filtering forces every compliant video decoder (in addition to the encoder) to perform filtering since such filtering cannot be excluded or separated from the video compression process.

Loop filtering defined under the JVT-AVC (Joint Video Team-Advanced Video CODEC) standard is particularly complex in that each pixel or picture element (luminance and/or chrominance value) in a video frame may potentially be filtered at a different level and the process that determines the level of filtering may be quite complex. The JVT-AVC standard specifies filtering of macroblocks comprising a matrix of 16×16 picture elements. It has been estimated that activities of loop filtering for an optimized JVT-AVC codec may consume up to 50% of the codec's processing cycles, depending on the profile and level of the standard being employed. Thus, in a video decoder implementing a SIMD instruction set, it is advantageous to provide a loop filter that performs real-time filtering robustly in order to avoid processing or transmission delays in the video stream.

As known, SIMD instructions enable logical operations on multiple picture elements contained in a macroblock, but do not necessarily provide instructions for branching or looping. Although some SIMD architectures provide limited branching capability, the performance penalty introduced by branching, in terms of processing delays and breaking the flow of instructions during pipeline processing, requires such instructions to be used only in exceptional cases.

SUMMARY OF THE INVENTION

A first aspect of the invention comprises a method of filtering video information encoded under a predictive encoding standard and processed utilizing SIMD instructions to transform individual pixels according to threshold values derived during predictive encoding. The method includes the steps obtaining statistical parameters from said video information, generating a filtering or transform mask based on the statistical parameters, and employing the filtering mask in conjunction with the SIMD instructions to transform individual pixels of the video information to produce a desired video output.

An additional aspect of the invention comprises a method of filtering predictive encoded streaming video information in order to filter individual elements of pixel groups. The method includes the steps of obtaining statistical parameters from video information encoded under a predictive encoding algorithm, generating a set of filtering masks based on the statistical parameters, and utilizing the filtering mask to filter individual elements of the pixel groups by gating one of filtered and unfiltered pixel group over a video channel.

Another aspect of the invention comprises an apparatus that filters video information utilizing predictive encoding and that utilizes a set of program instructions to process individual pixels according to threshold values derived during predictive encoding. The apparatus includes a processor that obtains statistical parameters from the encoded video information, a first routine to generate a filtering mask based on the statistical parameters, and a second routine that employs the filtering mask in conjunction with the program instructions to transform individual pixels of the video information to produce a desired video output.

A further aspect of the invention comprises an article of manufacture that includes computer program code to effect filtering of video information wherein the computer readable code is operative to obtain statistical parameters from encoded video information, to derive threshold values during predictive encoding of the video information, to generate a filtering mask based on the statistical parameters, and to employ the filtering mask and threshold values to transform individual pixels of the video information to produce a desired video output.

Other aspects of the invention will become apparent upon review of the following description taken in conjunction with the accompanying drawings. The invention, though, is pointed out by the appended claims.

DESCRIPTION OF ILLUSTRATIVE EMBODIMENTS

The present invention provides a method and an apparatus to efficiently filter video data processed by SIMD instructions in which different levels of filtering may be applied on a pixel-by-pixel basis without the usually attendant branching routines or processing delays of prior filtering techniques. The illustrated embodiment is applied to a JVT-AVC codec, but the inventive concept may equally apply to other video encoding/decoding methods and devices.

In a first embodiment, filtering is performed on pixels of a data set in a SIMD group and then the filtered output is selectively gated depending on the level of filtering required at individual pixels. A "filtering mask," for example, may be used for this purpose. Such a "filtering mask" separately defines rules to transform or "map" the data set to the desired output on a pixel-by-pixel basis. The "filtering mask" not only enables or disables the filtering operation as seen by individual pixels being filtered in the SIMD group, but also may control and/or modulate the extent of filtering applied to the pixels. Thus, an aspect of the present invention concerns a dual-use filtering mask and a method thereof particularly suited to SIMD architectures.

A particular embodiment applicable to the JVT-AVC standard illustrates a decision map that effectively yields a "filtering mask" to serve the dual purpose, e.g., on-off switching of the filtering operation at the pixel level and also to adjust the level or extent of filtering at the pixel level. Efficient organization of the decision tree advantageously enables a reduction in the number of instructions required to perform filtering using SIMD instructions. Furthermore, the nature of the illustrated algorithms, as applied to the JVT-AVC standard, particularly lends itself to SIMD instructions that employ multiple processing elements.

Although the illustrated embodiment sets forth a method to implement filtering under the JVT-AVC standard, the general techniques of organizing a decision tree or transform that maps threshold parameters to the appropriate filter coefficients thereby to yield a "filtering mask," and the dual use of the resulting filtering or prediction mask are applicable to other standards of filtering video and/or to an apparatus that carries out such algorithms. The illustrated embodiment sets forth an application of the invention to horizontal filtering useful under the JVT-AVC standard and includes an article of manufacture embodying program code to effect such filtering in accordance with the methods disclosed herein.

Figure 1:
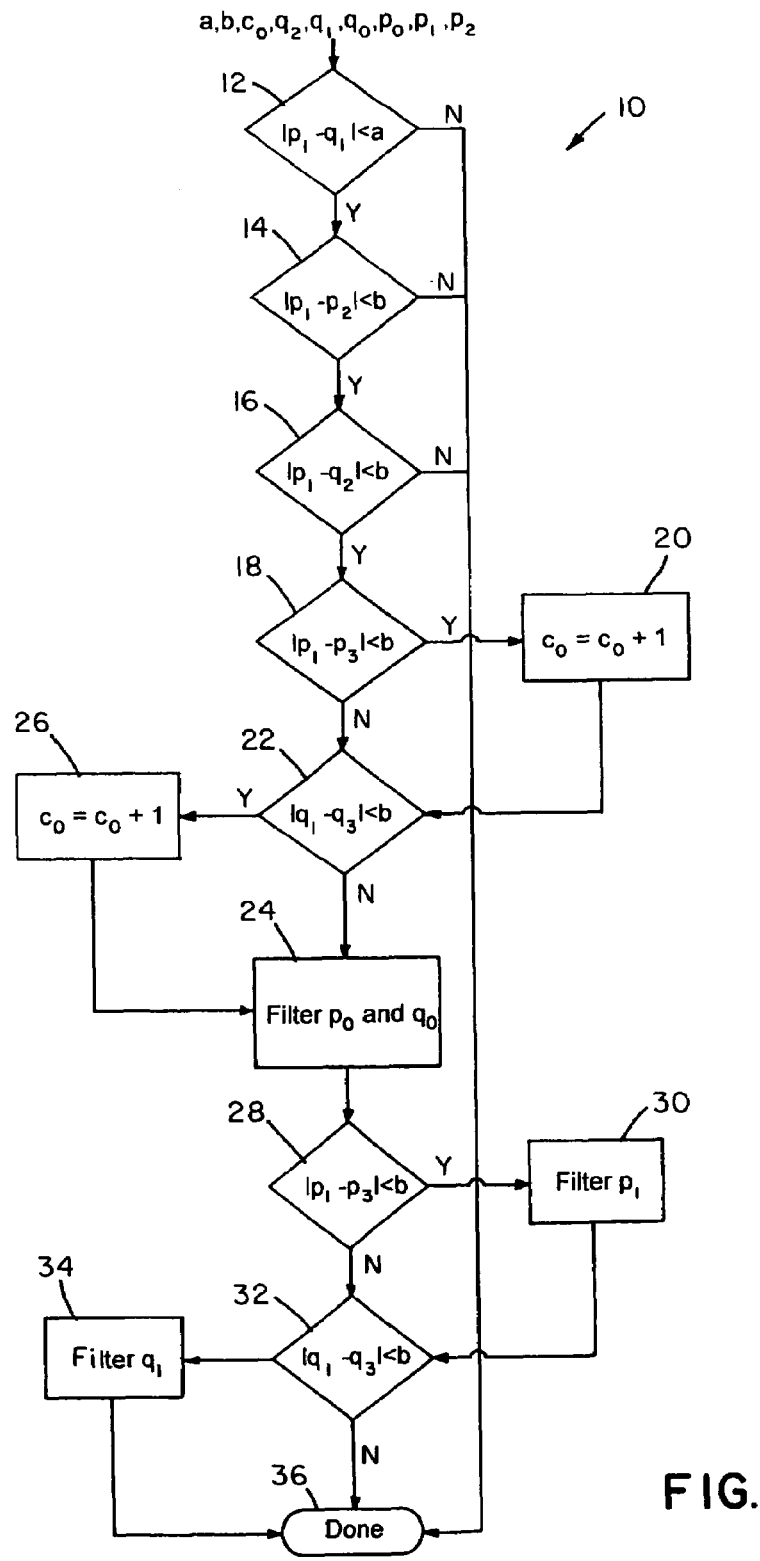
FIG. 1 shows a conventional scheme to filter a row (or column) of pixels under the JVT-AVC standard.

The JVT-AVC standard specifies two types of filters: a default filter and a strong filter. Default filtering is illustrated herein. Default horizontal filtering defined under the JVT-AVC standard takes place on a group of six pixels in a row, designated as $q_2$, $q_1$, $q_0$, $p_2$, $p_1$ and $p_0$. FIG. 1 illustrates filtering a group of six pixels by applying thresholds. Under the JVT-AVC standard, sixteen sets of six-pixel groups may be filtered together in one round of filtering provided the SIMD instruction set supports such long instructions. Many such sets may be processed in a single group. A typical SIMD architecture supports simultaneous processing of four such sets.

FIG. 1 shows a logical flow process 10 to filter a row (or column) of pixel elements $q_2$, $q_1$, $q_0$, $p_2$, $p_1$ and $p_0$. During processing, these pixel elements are respectively extracted from vectors $Q_2$, $Q_1$, $Q_0$, $P_2$, $P_1$ and $P_0$. A vector may comprise any number of pixel elements depending on the number supported by the SIMD or similar type of instruction set. The process 10 is applied recursively to each pixel contained in the vectors. Loop filtering specified under the JVT-AVC standard applies a variable level of digital filtering at each pixel. Filtering is controlled by three threshold parameters a, b, and $c_0$ specified under the standard. Thresholds a and b, for example, determine whether to apply filtering at a particular pixel and threshold $c_0$ controls or sets the maximum deviation of the filtered output from an unfiltered value.

In the illustrated process 10, step 12 examines whether the absolute value of the difference between picture elements $q_1$, and $p_1$ exceeds threshold a. If not, the routine branches to done step 36. If affirmative, a next comparison is made at step 14 relative to whether the absolute value of the difference between picture elements $p_1$ and $p_2$ exceeds threshold b. The process is repeated at step 16 relative to picture elements $q_1$ and $q_2$. Step 18 examines whether the absolute value of the difference between $p_1$ and $p_3$, a pixel elements in neighboring group, exceeds threshold b. If affirmative, threshold $c_0$ is indexed by the integer "1" (step 20) before proceeding to step 22, which repeats the comparison and examination relative to picture elements $q_1$, and $q_3$. Pixel element $q_3$ is also an element contained in another group. If, at step 18, the absolute value of the difference between $p_1$ and $p_3$ is less than threshold b, step 20 is bypassed. At step 22, $q_1$ and $q_2$ are similarly tested. If threshold b is not exceeded, threshold $c_0$ is indexed at step 26 before filter filtering $p_0$ and $q_0$ at step 24. Otherwise, $p_0$ and $q_0$ are filtered at step 24. At step 28, $p_1$ and $p_3$ are examined relative to threshold b. At step 30, $p_1$ is filtered if the threshold is not exceeded. If threshold b is exceeded at step 28, $q_1$ and $q_3$ are examined at step 32 to determine whether their difference exceeds threshold b. If the difference is less than threshold b, $q_1$ is filtered at step 34. Otherwise, the process is done, at step 36.

The values of thresholds a, b, and $c_0$ are derived from various encoder parameters, such as a quantization scale, extent of motion, number of non-zero quantized coefficients, and/or other spatial, temporal, or static parameters related to the video information. Also, a recursive process implemented during filtering enforces a particular order in which the pixels within the video stream are filtered in order to conform filtering to the standard. Filtering may take place along rows of pixels (horizontal filtering) or along columns of pixels (vertical filtering).

In the illustrated embodiment, $Q_2$, $Q_1$, $Q_0$, $P_2$, $P_1$ and $P_0$ respectively denote vector versions of $q_2$, $q_1$, $q_0$, $p_2$, $p_1$ and $p_0$. For example, in a four-way SIMD architecture, $Q_2$ may represent a group of four adjacent pixels in a column. Similarly, A, B and $C_0$ are the vector versions of a, b and $c_0$ respectively.

Figure 2:
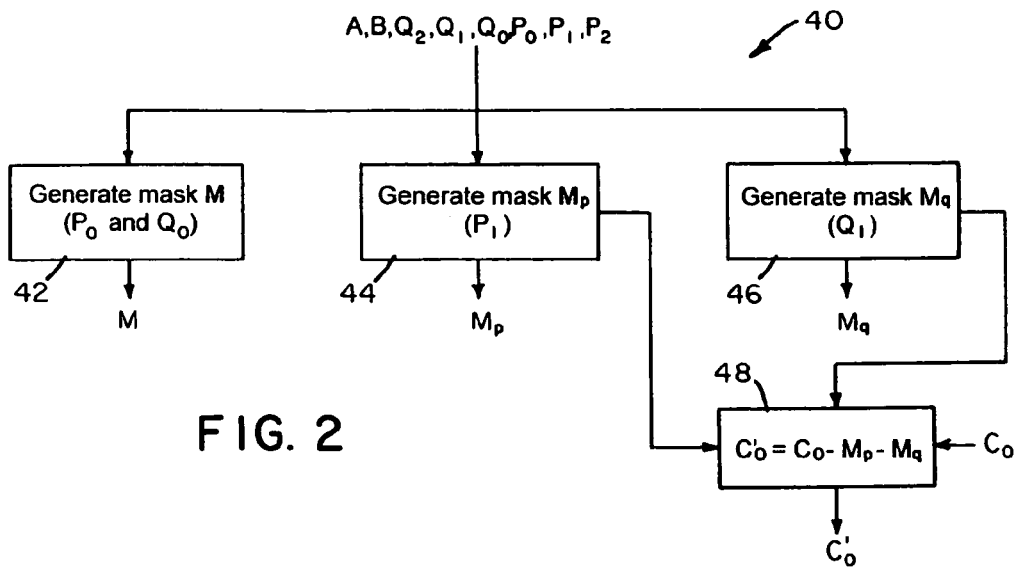
FIG. 2 illustrates a method of producing a filter mask and generating a filtering threshold value useful to modify and/or modulate the filter output according to an aspect of the present invention.

FIG. 2 illustrates a process 40 to generate a series of masks or transform maps used to selectively gate and/or modulate the extent of filtering applied to the picture elements. When used in a SIMD environment, each mask 42, 44, 46, and 48 is generated using logical operations supported by SIMD instructions. Mask M (42) controls filtering of pixel vectors $Q_0$ and $P_0$, i.e., the corresponding SIMD elements in mask M (42) would be −1 in two's complement notation if the corresponding filtered elements in $Q_0$ and $P_0$ are zero. Similarly, mask $M_p$ (44) and mask $M_q$ (46) respectively control filtering of pixel vectors $P_1$ and $Q_1$. By taking advantage of the two's complement notation of masks $M_p$ (44) and $M_q$ (46), the operation at step 48 conveniently modulates input threshold or maximum deviation vector $C_0$ to obtain a modified vector $C_0'$, as required by the standard through a simple process of subtracting masks $M_p$ and $M_q$ from vector $C_0$. Thus, the invention advantageously achieves a dual use of the masks to control both pixel vector filtering and threshold modulation.

Depending on the SIMD instructions available, generation of the masks on a particular architecture may be slightly different. The following code snippet shows derivation of mask M (42) in the embodiment illustrated in FIG. 2, $$M=(|P_1-Q_1|<A)\text{AND}(|P_1-P_2|<B)\text{AND}(|Q_1-Q_2|<B) \quad (1)$$

where |x| denotes an element-wise absolute value operation on "x" and "AND" denotes a logical, element-wise "and" operation.

Similarly, mask Mp (44) and Mq (46) of FIG. 2 are given by:

$$M_p=(|P_1-P_3|<B)\text{AND}(M) \quad (2)$$

$$M_q=(|Q_1-Q_3|<B)\text{AND}(M) \quad (3)$$

Figure 3:
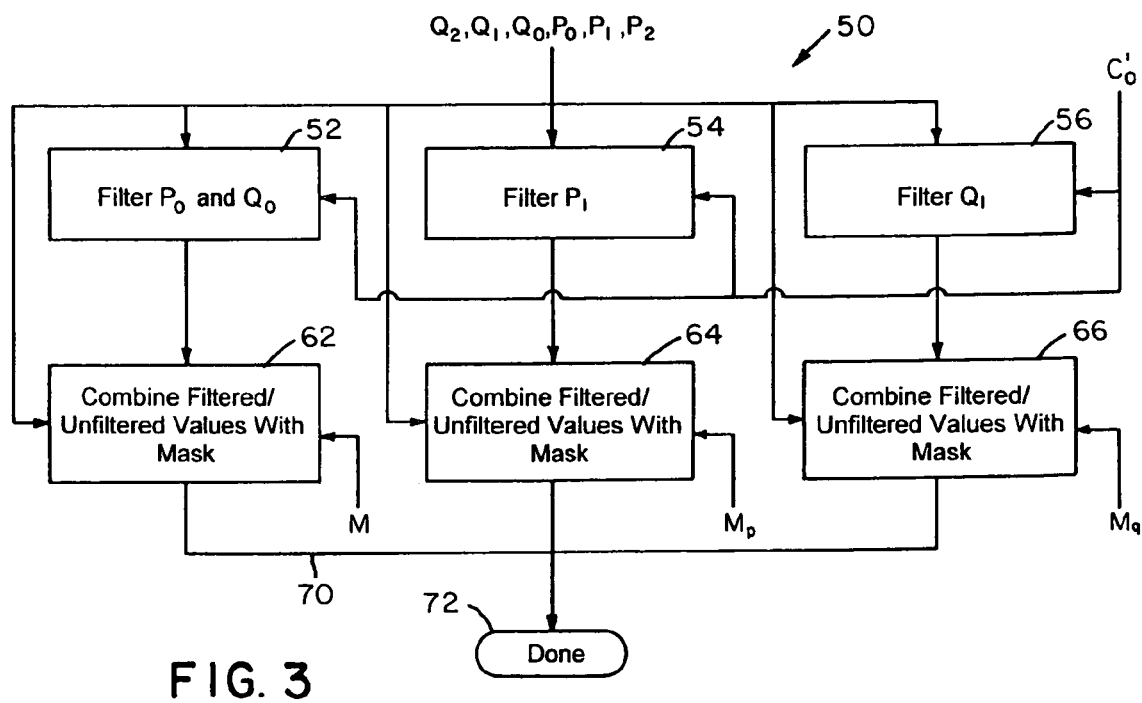
FIG. 3 illustrates a method of filtering pixel vectors of video information using the filter mask and threshold value described in FIG. 2.

FIG. 3 shows an application of masks 42, 44 and 46 and the maximum allowed deviation vector $C_o'$ to pixel vectors $Q_2$, $Q_1$, $Q_0$, $P_2$, $P_1$ and $P_0$. As shown, filters 52, 54, and 56 respectively filter the individual pixel elements of vectors $Q_2$, $Q_1$, $Q_0$, $P_2$, $P_1$ and $P_0$ irrespective of whether filtering or non-filtering is denoted for a corresponding element in the mask. The individual pixel elements of the vectors are applied in groups to filters 52, 54, and 56, which carry out the filtering operations substantially shown in FIG. 1. The filtering processes implemented by filters 52, 54, and 56, however, use the modified threshold value $c_o'$ of vector $C_o'$ instead of threshold value $c_o$ at corresponding steps 20 and 26 of FIG. 1.

The filtered outputs of filters 52, 54, and 56 and the masks M, $M_p$, and $M_q$ are respectively applied to combiners 62, 64, and 66, which effectively "gate," i.e., switch between, the filtered outputs of filters 52, 54, and 56 or unfiltered vectors $Q_2$, $Q_1$, $Q_0$, $P_2$, $P_1$ and $P_0$. The combiners pass either the filtered or unfiltered video to the video channel 70. For example, if F represents a filtered value, U represents an unfiltered value, and M is a mask that is used to filter U to produce F, each of the combinatorial blocks 62, 64, and 66 outputs (U AND COMPLEMENT(M))+(F AND M), where COMPLEMENT(M) denotes an element-wise one's complement of "M." By virtue of the masking operation, the individual pixel elements as a group are modulated and/or filtered in a single instruction thereby eliminating branching operations that may otherwise be required to determine the transformation of each individual pixel.

In some implementations, there may be slight variations in the masking process. For example, when the JVT-AVC standard specifies the computation of a difference (D) between the filtered and unfiltered values, the combinatorial block outputs U+(D AND M).

As described above, the illustrated embodiment is shown to conform to the JVT-AVC standard but may be modified to apply to other encoding/decoding algorithms based on the teachings herein. The number of pixel elements processed in a group may also vary, as well as the number and character of the transform or "filtering maps." The invention also may be implemented with any type of "single instruction multiple data" (SIMD) instruction set or in an environment utilizing routine program instructions. Some or all of the pixel elements of a video stream may be filtered without departing from the scope of the invention. Thus, the invention may form part of a hybrid filter when used in conjunction with other filtering techniques. Further; spatial, temporal or other parameters of the encoded video from which to derive threshold values and/or to modulate or adjust level may also vary from those disclosed herein.

What is claimed is:

1. A method of filtering predictive encoded streaming video information in order to filter individual elements of pixel groups, said method comprising:
   obtaining statistical parameters from video information encoded under a predictive encoding algorithm,
   utilizing a single-instruction-multiple-data instruction, generating a set of filtering masks based on said statistical parameters, and
   in response to a threshold value derived from said statistical parameters, selectively utilizing said filtering mask to filter individual elements of said pixel groups by gating one of filtered and unfiltered pixel groups over a video channel,
   wherein the generating step comprises generating filtering masks including a mask $M=(|P_1-Q_1|<A)\text{AND}(|P_1-P_2|<B)\text{AND}(|Q_1-Q_2|<B)$, a mask $M_p=(|P_1-P_3|<B)\text{AND}(M)$ and mask $M_q=(|Q_1-Q_3|<B)\text{AND}(M)$ where $P_x$ and $Q_x$, x being said specified integers, are pixel vectors having multiple pixel elements, A and B represent respective vectors of threshold values, and AND represent logical "AND" operation.

2. The method of claim 1, wherein said encoding algorithm utilizes a deviation threshold that determines a maximum deviation between filtered and unfiltered elements, said method further comprising:
   modifying the deviation threshold utilized during predictive encoding according to said filtering mask.

3. The method of claim 2, wherein said modifying comprises utilizing a modified deviation threshold $C_0'$ determined by subtracting masks $M_p$ and $M_q$ from $C_0$, where $C_0$ is a vector representation of threshold value, $C_0'$ is a vector representation of modified threshold values, and mask $M_p=(|P_1-P_3|<B)\text{AND}(M)$ and mask $M_q=(|Q_1-Q_3|<B)\text{AND}(M)$.

* * * * *